(12) United States Patent
Ataka et al.

(10) Patent No.: US 9,533,916 B2
(45) Date of Patent: Jan. 3, 2017

(54) GYPSUM SLURRY, HARDENED GYPSUM, GYPSUM BUILDING MATERIAL, GYPSUM BOARD, METHOD OF PRODUCING GYPSUM SLURRY, METHOD OF PRODUCING HARDENED GYPSUM, METHOD OF PRODUCING GYPSUM BUILDING MATERIAL, AND METHOD OF PRODUCING GYPSUM BOARD

(71) Applicant: YOSHINO GYPSUM CO., LTD., Tokyo (JP)

(72) Inventors: Yuji Ataka, Tokyo (JP); Ken Watanabe, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 0 days.

(21) Appl. No.: 15/036,462

(22) PCT Filed: Oct. 22, 2014

(86) PCT No.: PCT/JP2014/078120
§ 371 (c)(1),
(2) Date: May 13, 2016

(87) PCT Pub. No.: WO2015/079835
PCT Pub. Date: Jun. 4, 2015

(65) Prior Publication Data
US 2016/0289122 A1   Oct. 6, 2016

(30) Foreign Application Priority Data
Nov. 28, 2013   (JP) .................. 2013-246716

(51) Int. Cl.
*C04B 28/14*   (2006.01)
*C04B 24/24*   (2006.01)
*C04B 24/28*   (2006.01)
*C04B 111/27*   (2006.01)

(52) U.S. Cl.
CPC ............ *C04B 28/14* (2013.01); *C04B 24/243* (2013.01); *C04B 24/28* (2013.01); *C04B 2111/27* (2013.01)

(58) Field of Classification Search
CPC .......... B28C 1/06; C04B 11/00; C04B 24/243; C04B 28/14; C04B 38/106
See application file for complete search history.

(56) References Cited

U.S. PATENT DOCUMENTS

| | | |
|---|---|---|
| 2,487,036 A | 11/1949 | Wise et al. |
| 9,321,685 B2 * | 4/2016 | Ataka .................... C04B 28/14 |
| 2002/0040666 A1 | 4/2002 | Eck et al. |
| 2006/0278133 A1 | 12/2006 | Yu et al. |
| 2009/0036572 A1 | 2/2009 | Geeraert |
| 2011/0009564 A1 | 1/2011 | Wang et al. |
| 2013/0011553 A1 | 1/2013 | Muramatsu et al. |

FOREIGN PATENT DOCUMENTS

| | | |
|---|---|---|
| EP | 1120384 | 8/2001 |
| JP | 2005-271444 | 10/2005 |
| JP | 2008-249846 | 10/2008 |
| JP | 2008-543705 | 12/2008 |
| JP | 2009-528246 | 8/2009 |
| WO | 2011/087781 | 7/2011 |
| WO | 2011/122599 | 10/2011 |

OTHER PUBLICATIONS

International Search Report mailed on Jan. 20, 2015.
Extended European search report mailed Oct. 24, 2016.

* cited by examiner

*Primary Examiner* — Anthony J Green
(74) *Attorney, Agent, or Firm* — IPUSA, PLLC

(57) ABSTRACT

A gypsum slurry includes calcined gypsum, urea phosphate esterified starch, organopolysiloxane, and water.

16 Claims, 4 Drawing Sheets

GYPSUM SLURRY, HARDENED GYPSUM, GYPSUM BUILDING MATERIAL, GYPSUM BOARD, METHOD OF PRODUCING GYPSUM SLURRY, METHOD OF PRODUCING HARDENED GYPSUM, METHOD OF PRODUCING GYPSUM BUILDING MATERIAL, AND METHOD OF PRODUCING GYPSUM BOARD

TECHNICAL FIELD

The present invention relates to gypsum slurry, hardened gypsum, a gypsum building material, a gypsum board, a method of producing gypsum slurry, a method of producing hardened gypsum, a method of producing a gypsum building material, and a method of producing a gypsum board.

BACKGROUND ART

Generally, gypsum products do not have sufficient water resistance to allow them to be used in a "near-water" place where they might be in contact with water.

However, because there is a need to use a gypsum product in such a near-water place, research has been conducted to find a method to give water repellency to a gypsum product so that it can be used in a near-water place. In a proposed method, a water repellent such as a silicone oil or wax, or a water-repellent adjuvant that efficiently enhances the performance of a water repellent is added to gypsum slurry to give water repellency.

For example, Patent Document 1 discloses a method of waterproofing a gypsum product where at least one type of compound including polysiloxane and at least one type of compound including pregelatinized starch (a starch) are added to a plaster composition.

RELATED-ART DOCUMENT

Patent Document

[Patent Document 1] Japanese Laid-Open Patent Publication No. 2009-528246

DISCLOSURE OF INVENTION

Problems to be Solved by the Invention

Generally, when producing a gypsum product, gypsum slurry prepared by mixing gypsum, water, and additives is formed into a desired shape and is solidified. However, because pregelatinized starch increases the viscosity and decreases the fluidity of gypsum slurry, adding pregelatinized starch greatly degrades the handling of the gypsum slurry and sometimes makes it hard to form the gypsum slurry into a desired shape.

The fluidity of gypsum slurry may be improved by adding a large amount of kneading water or adding a dispersing agent. However, when a large amount of kneading water is added, the amount of thermal energy necessary to evaporate excessive kneading water increases. Also, adding a dispersing agent increases the production costs.

An aspect of the present invention makes it possible to solve or reduce the above problems of the related-art technologies, and to provide gypsum slurry that has excellent fluidity and exhibits water repellency when formed into hardened gypsum.

Means for Solving the Problems

An embodiment of the present invention provides a gypsum slurry including calcined gypsum, urea phosphate esterified starch, organopolysiloxane, and water.

Advantageous Effect of the Invention

An embodiment of the present invention makes it possible to provide gypsum slurry that has excellent fluidity and exhibits water repellency in the form of hardened gypsum.

DESCRIPTION OF EMBODIMENTS

Figure 1:
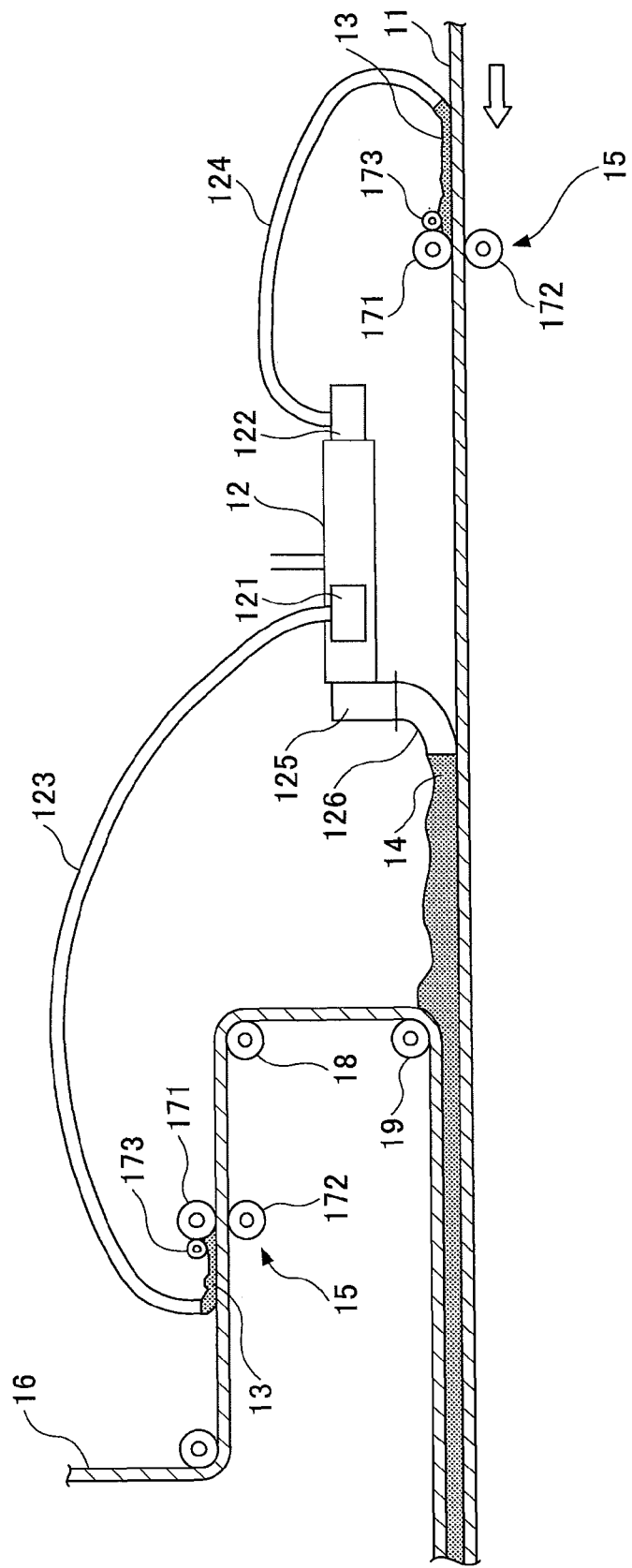
FIG. 1 is a drawing used to describe a method of producing a gypsum board according to an embodiment of the present invention.

Embodiments of the present invention are described below. However, the present invention is not limited to those embodiments, and variations and modifications may be made without departing from the scope of the present invention.

<<Gypsum Slurry>>

An exemplary configuration of gypsum slurry of an embodiment is described below.

Gypsum slurry of the present embodiment is preferably prepared by mixing calcined gypsum, urea phosphate esterified starch, organopolysiloxane, and water.

Components of the gypsum slurry of the present embodiment are described below.

Calcined gypsum is also called calcium sulfate hemihydrate, and is an inorganic composition having a hydraulic property. Examples of calcined gypsum include β-hemihydrate gypsum obtained by calcining one of or a mixture of natural gypsum, by-product gypsum, flue-gas gypsum, and waste gypsum in the atmosphere; and α-hemihydrate gypsum obtained by calcining one of or a mixture of these types of gypsum in water. As the calcined gypsum, one of or a mixture of α-hemihydrate gypsum and β-hemihydrate gypsum may be used. Calcining in water includes a case where gypsum is calcined in steam.

As a non-limiting example, starch derived from corn, sweet potato, wheat, or tapioca is preferably used as a material of urea phosphate esterified starch. Starch derived from corn is particularly preferable as a material of urea phosphate esterified starch.

Although the urea phosphate esterified starch used for the gypsum slurry of the present embodiment is not limited to any specific type, the gelatinization temperature (pregelatinization temperature) of the urea phosphate esterified starch is preferably less than or equal to 100° C., and more preferably less than or equal to 90° C. The reason for this is described below.

First, as described later, the urea phosphate esterified starch added to the gypsum slurry of the present embodiment is preferably gelatinized (pregelatinized) after the gypsum slurry is molded. One exemplary method of gelatinizing the urea phosphate esterified starch added to the gypsum slurry is to heat the molded gypsum slurry.

Here, in the molded gypsum slurry, calcined gypsum (hemihydrate gypsum), which is a material of the gypsum slurry, has been hydrated to become dihydrate gypsum. When the molded gypsum slurry is heated at a temperature greater than 100° C., a part of the dihydrate gypsum returns to hemihydrate gypsum. This may decrease the strength of obtained hardened gypsum. Also, because hemihydrate gypsum has a water absorbing property, the water repellency of obtained hardened gypsum may decrease.

For the above reasons, urea phosphate esterified starch with a gelatinization temperature of less than or equal to 100° C. is preferably used to lower the heating temperature necessary for gelatinization, and thereby suppress generation of hemihydrate gypsum when the urea phosphate esterified starch in the molded gypsum slurry is gelatinized by heating. Using urea phosphate esterified starch with a gelatinization temperature of less than or equal to 90° C., is more preferable to more effectively suppress generation of hemihydrate gypsum during gelatinization.

The lower limit of the gelatinization temperature of urea phosphate esterified starch is not limited to any specific value. However, urea phosphate esterified starch is preferably not gelatinized when added to gypsum slurry and is preferably gelatinized after the gypsum slurry is molded.

As a non-limiting example, the amount of urea phosphate esterified starch added to gypsum slurry is preferably greater than or equal to 0.05 parts by mass and less than or equal to 10 parts by mass with respect to 100 parts by mass of calcined gypsum.

It is assumed that the urea phosphate esterified starch added to the gypsum slurry functions as a water-repellent adjuvant that enhances the water repellency of organopolysiloxane added as a water repellent to the gypsum slurry. A sufficient effect of urea phosphate esterified starch of enhancing the water repellency of organopolysiloxane starts to appear when 0.05 parts by mass or more of urea phosphate esterified starch with respect to 100 parts by mass of calcined gypsum is added to the gypsum slurry. On the other hand, when the amount of urea phosphate esterified starch exceeds 10 parts by mass, the rate of increase in the effect of enhancing the water repellency of organopolysiloxane slows down. For this reason, the amount of urea phosphate esterified starch to be added is preferably within the range described above.

The urea phosphate esterified starch added to the gypsum slurry also has an effect of hardening the gypsum slurry and increasing the strength of hardened gypsum. The urea phosphate esterified starch added within the above described range can particularly increase the strength of hardened gypsum. Thus, also for this reason, it is preferable to add urea phosphate esterified starch to the gypsum slurry.

The amount of urea phosphate esterified starch is more preferably greater than or equal to 0.05 parts by mass and less than or equal to 5 parts by mass with respect to 100 parts by mass of calcined gypsum. This is because when, for example, a gypsum board with a thickness of 12.5 mm is created using gypsum slurry including urea phosphate esterified starch of greater than 5 parts by mass, the gypsum board may not satisfy the conditions of the heat generation property grade 1 defined in JIS A 6901. When hardened gypsum obtained by hardening gypsum slurry is used as a building material, incombustibility may be required in addition to water repellency and strength as a property of the hardened gypsum. Therefore, the amount of urea phosphate esterified starch is preferably determined according to requirements. The amount of urea phosphate esterified starch is further preferably greater than or equal to 0.05 parts by mass and less than or equal to 3 parts by mass with respect to 100 parts by mass of calcined gypsum.

Also, there is a case where bubbles are added to gypsum slurry, and hardened gypsum including bubbles is produced by hardening the gypsum slurry to reduce the weight of the hardened gypsum. In this case, urea phosphate esterified starch has a function to keep the shape of bubbles in the gypsum slurry and the hardened gypsum.

Accordingly, when bubbles with a substantially uniform diameter are added to gypsum slurry, a normal spherical shape of the bubbles in the gypsum slurry and the hardened gypsum can be well maintained, and the diameter of the bubbles can be made substantially uniform. Including bubbles with a normal spherical shape and a substantially uniform diameter in hardened gypsum makes it possible to increase the strength as well as to reduce the weight of the hardened gypsum.

Here, bubbles added to gypsum slurry are fine bubbles that do not reduce the quality of hardened gypsum.

As a non-limiting example, gypsum slurry including bubbles may be formed by adding a blowing agent to water in advance, forming bubbles by agitating the water while introducing air, and mixing the formed bubbles with a gypsum composition and water. Also, bubbles may be added to gypsum slurry formed in advance by mixing a gypsum composition and water. Examples of blowing agents used to form bubbles include, but are not limited to, sodium alkylsulfate, alkyl ether sulfate, sodium alkylbenzene sulfonate, and polyoxyethylene alkyl sulfate.

Next, organopolysiloxane is described. Various types of organopolysiloxane may be used for gypsum slurry of the present embodiment. For example, organopolysiloxane used for gypsum slurry of the present embodiment may include methylhydrogenpolysiloxane having a structure represented by a general formula (1) below.

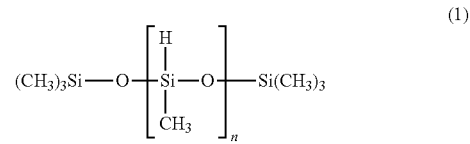

$$(CH_3)_3Si-O-\left[\begin{matrix}H\\|\\Si-O\\|\\CH_3\end{matrix}\right]_n-Si(CH_3)_3 \quad (1)$$

In the general formula (1), the range of "n" is preferably, but is not limited to, greater than or equal to 1 and less than or equal to 100.

One or more types of organopolysiloxane may be added to gypsum slurry. For example, only methylhydrogenpolysiloxane having a structure expressed by the general formula (1) may be added to gypsum slurry, or another type of organopolysiloxane may be added together with methylhydrogenpolysiloxane to gypsum slurry.

The amount of organopolysiloxane to be added to gypsum slurry is not limited to any specific value, and may be determined based on, for example, the degree of water repellency required for hardened gypsum. For example, the amount of organopolysiloxane is preferably greater than or equal to 0.2 parts by mass and less than or equal to 5 parts by mass with respect to 100 parts by mass of calcined gypsum. This is because high water repellency of hardened gypsum can be achieved by adding 0.2 or more parts by mass of organopolysiloxane, and the water repellency does not greatly change when the amount of organopolysiloxane exceeds 5 parts by mass. The amount of organopolysiloxane is more preferably greater than or equal to 0.2 parts by mass and less than or equal to 1 parts by mass with respect to 100 parts by mass of calcined gypsum.

Organopolysiloxane may be added to gypsum slurry without being processed, or may be added to gypsum slurry after being emulsified in water. Emulsifying organopolysiloxane makes it easier to uniformly mix organopolysiloxane in gypsum slurry, and is preferable.

Any type of emulsifier may be used to emulsify organopolysiloxane in water. For example, a nonionic emulsifier, an anionic emulsifier, or polyvinyl alcohol may be used for this purpose.

Examples of nonionic emulsifiers include glycerol monostearate, glycerol monooleate, sorbitan monopalmitate, sorbitan monostearate, sorbitan tristearate, sorbitan monooleate, sorbitan trioleate, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, polyoxyethylene lauryl ether, polyoxyethylene cetyl ether, polyoxyethylene stearyl ether, polyoxyethylene higher alcohol ether, polyoxyethylene octyl-phenyl ether, and polyoxyethylene nonylphenyl ether.

Examples of anionic emulsifiers include sodium lauryl sulfate, sodium dodecylbenzenesulfonate, sodium alkylnaphthalene sulfonate, sodium dialkyl sulfosuccinate, mixed fatty acid soda soap, sodium stearate soap, oleic acid potash soap, sodium higher alcohol sulfate, and sodium salt of β-naphthalene sulfonic acid formalin condensate.

As polyvinyl alcohol, polyvinyl alcohol with a saponification degree greater than or equal to 75 mol % is preferable, and polyvinyl alcohol with a saponification degree greater than or equal to 76 mol % and less than or equal to 90 mol % is more preferable. The viscosity of a 4% aqueous solution of these types of polyvinyl alcohol at 20° C. is preferably greater than or equal to 1 centipoise and less than or equal to 80 centipoises, and more preferably greater than or equal to 3 centipoises and less than or equal to 50 centipoises. The amount of emulsifier is preferably greater than or equal to 0.5 mass % and less than or equal to 10 mass %, and more preferably greater than or equal to 0.7 mass % and less than or equal to 5 mass % with respect to organopolysiloxane. When the amount of emulsifier is less than 0.5 mass %, a stable emulsion may not be obtained; and when the amount of emulsifier is greater than 10 mass %, sufficient water repellency may not be obtained.

The amount of water added to a gypsum composition to produce gypsum slurry is not limited any specific value, and may be determined according to required fluidity.

The amount of water required to produce gypsum slurry does not change greatly depending on whether urea phosphate esterified starch is included. Therefore, the amount of heat necessary to dry gypsum slurry does not also change greatly depending on whether urea phosphate esterified starch is included. Accordingly, adding urea phosphate esterified starch makes it possible to obtain hardened gypsum having excellent water repellency without increasing drying costs.

Also, various other additives may be added to the gypsum slurry of the present embodiment.

As an example of an additive, a compound containing an oxide or a hydroxide of a group 2A element, which functions as a water repellent adjuvant (catalyst) to improve the water repellency of organopolysiloxane added as a water repellent to gypsum slurry, is preferably used. By adding a compound containing an oxide or a hydroxide of a group 2A element to gypsum slurry, it is possible to further improve the water repellency of hardened gypsum.

The group 2A element is not limited to any specific type, and may be selected from Ba, Mg, Ca, Sr, and Ra. The group 2A element is preferably one of Ba, Mg, and Ca, and more preferably one of Mg and Ca. Examples of compounds containing an oxide or a hydroxide of a 2A group element include barium hydroxide when the group 2A element is Ba; magnesium oxide and magnesium hydroxide when the group 2A element is Mg; and calcined lime, hydrated lime, cement, and calcium silicate hydrate when the 2A group element is Ca.

As a non-limiting example, the amount of the compound containing an oxide or a hydroxide of a 2A group element to be added to gypsum slurry is preferably greater than or equal to 0.1 part by mass and less than or equal to 100 parts by mass, and more preferably greater than or equal to 0.2 parts by mass and less than or equal to 10 parts by mass, with respect to 100 parts by mass of calcined gypsum. When the amount of the compound containing an oxide or a hydroxide of a 2A group element is less than 0.1 part by mass, the effect of adding the compound may not be sufficiently achieved. Also, when the amount of the compound exceeds 100 parts by mass, the setting of gypsum may be accelerated and the workability of gypsum slurry may be reduced. When the compound containing an oxide or a hydroxide of a group 2A element is added to gypsum slurry, it is preferable to use methylhydrogenpolysiloxane having a structure represented by the formula (1) above as organopolysiloxane. This is because the water repellency of hardened gypsum is particularly improved by using methylhydrogenpolysiloxane together with the compound containing an oxide or a hydroxide of a group 2A element.

In addition to or instead of the compound containing an oxide or a hydroxide of a group 2A element, one or more of other additives such as reinforcing fibers, a lightweight aggregate, a refractory material, a setting modifier, a water reducing agent, a bubble diameter modifier, and an adhesion improver, as well as bubbles described above may be added to the gypsum slurry of the present embodiment.

In a gypsum slurry production method of the present embodiment, the gypsum slurry may be produced by mixing (or kneading) calcined gypsum, urea phosphate esterified starch, organopolysiloxane, and water.

Also in a gypsum slurry production method of the present embodiment, materials of the gypsum slurry may be mixed in two steps. That is, a gypsum slurry production method of the present embodiment may include a gypsum composition forming step of forming a gypsum composition by mixing calcined gypsum and urea phosphate esterified starch, and a gypsum slurry forming step of forming gypsum slurry by mixing the gypsum composition, organopolysiloxane, and water.

In the gypsum composition forming step, solids, i.e., calcined gypsum and urea phosphate esterified starch, are mixed to produce a gypsum composition. Next, in the gypsum slurry forming step, liquids, i.e., organopolysiloxane and water, are mixed with the gypsum composition to produce gypsum slurry.

Also, various additives and bubbles may be added to the gypsum slurry of the present embodiment. Additives and bubbles may be added at any appropriate timing. However, a solid additive such as a compound containing an oxide or a hydroxide of a 2A group element is preferably added when calcined gypsum and urea phosphate esterified starch are mixed. A liquid additive is preferably added when the gypsum composition, which is a mixture, is mixed with organopolysiloxane and water. Also, bubbles are preferably added after gypsum slurry is produced.

Preferable amounts and details of components of the gypsum slurry are substantially the same as those described above, and their descriptions are omitted here.

As described above, the gypsum slurry of the present embodiment includes urea phosphate esterified starch that functions as a water-repellent adjuvant. This configuration makes it possible to improve the water repellency of hardened gypsum obtained by hardening the gypsum slurry.

Also, because the fluidity of gypsum slurry is hardly reduced by adding urea phosphate esterified starch, the above embodiment makes it possible to produce gypsum slurry with excellent fluidity. Also, the amount of water added to produce gypsum slurry in a case where urea phosphate esterified starch is added is not greatly different from the amount of added water in a case where urea phosphate esterified starch is not added. Accordingly, the above embodiment can also suppress an increase in drying costs.

Further, urea phosphate esterified starch can improve the strength of hardened gypsum obtained by hardening the gypsum slurry.

<<Hardened Gypsum>>

Next, hardened gypsum of the present embodiment is described.

Here, hardened gypsum obtained by hardening the above described gypsum slurry is described.

Hardened gypsum of the present embodiment is obtained by causing hemihydrate gypsum in the above-described gypsum slurry to form acicular crystals of dihydrate gypsum by hydration reaction, and to set and solidify. Hardened gypsum with a desired shape can be obtained by molding the gypsum slurry before it solidifies.

The hardened gypsum of the present embodiment may have any desired shape. For example, when the hardened gypsum is used for a building material, the hardened gypsum may be formed in a plate shape or a block shape. In this case, like a gypsum building material and a gypsum board described later, board base paper or a glass fiber nonwoven fabric may be provided on the surface of or inside of plate-shaped hardened gypsum. Also, the gypsum slurry may be formed into putty by adjusting its viscosity and used as a joint filler that is put into a gap between materials and hardened. That is, the hardened gypsum may be formed in a shape corresponding to a gap between materials.

Next, a hardened gypsum production method of the present embodiment is described.

As described above, the hardened gypsum of the present embodiment is obtained by molding the above-described gypsum slurry into a desired shape, and causing the molded gypsum slurry to set and solidify. Accordingly, a hardened gypsum production method of the present embodiment may include a molding step of molding the gypsum slurry obtained by the above described gypsum slurry production method to form molded gypsum slurry.

The water repellency of the hardened gypsum of the present embodiment can be improved by gelatinizing urea phosphate esterified starch in the gypsum slurry during its production process. Therefore, the hardened gypsum production method preferably includes a gelatinization step of gelatinizing urea phosphate esterified starch in the molded gypsum slurry after the molding step.

As a non-limiting example, urea phosphate esterified starch added to the gypsum slurry may be gelatinized by heating the molded gypsum slurry to a temperature that is higher than the gelatinization temperature of urea phosphate esterified starch. As another example, urea phosphate esterified starch may be gelatinized by bringing the molded gypsum slurry into contact with sodium hydroxide.

Urea phosphate esterified starch added to the gypsum slurry may be gelatinized by heating the molded gypsum slurry to a temperature that is higher than the gelatinization temperature of urea phosphate esterified starch. However, when the temperature to gelatinize urea phosphate esterified starch is too high, dihydrate gypsum, which is obtained when hemihydrate gypsum is mixed with water to produce the gypsum slurry, may return to hemihydrate gypsum. If dihydrate gypsum returns to hemihydrate gypsum, the strength of obtained hardened gypsum may decrease. Also, because hemihydrate gypsum has a water absorbing property, the water repellency of obtained hardened gypsum may also decrease. To prevent dihydrate gypsum from returning to hemihydrate gypsum, in the gelatinization step of gelatinizing urea phosphate esterified starch, the molded gypsum slurry is preferably heated at a temperature less than or equal to 100° C. In the gelatinization step, the molded gypsum slurry is more preferably heated at a temperature less than or equal to 90° C. To hold the heating temperature in the gelatinization step within the above temperature range, urea phosphate esterified starch with a gelatinization temperature within the above temperature range is preferably used.

Normally, the molded gypsum slurry is made into hardened gypsum through a drying step of removing water in the molded gypsum slurry. The gelatinization step may be performed separately from the drying step, or as a part of the drying step. That is, in a part or the entirety of the drying step, the drying temperature may be set at a value greater than or equal to the gelatinization temperature of urea phosphate esterified starch so that the drying of the molded gypsum slurry and the gelatinization of urea phosphate esterified starch in the molded gypsum slurry can be performed at the same time.

Also, when the gelatinization step is performed on the molded gypsum slurry, a part or the whole of the molded gypsum slurry may have been hardened. However, the gelatinization step is preferably performed after the whole of the molded gypsum slurry is hardened, i.e., after the calcined gypsum in the gypsum slurry is completely hydrated and changed into dihydrate gypsum.

As described above, urea phosphate esterified starch may also be gelatinized by bringing the molded gypsum slurry into contact with sodium hydroxide. For example, the molded gypsum slurry may be brought into contact with sodium hydroxide by immersing the molded gypsum slurry into a sodium hydroxide solution or by applying a sodium hydroxide solution to the molded gypsum slurry.

Also, urea phosphate esterified starch may be gelatinized by adding sodium hydroxide to the gypsum slurry before (preferably, immediately before) the gypsum slurry is molded.

The hardened gypsum production method of the present embodiment may also include a rough cutting step, a drying step, a cutting step, and a loading step.

The rough cutting step is performed before, for example, the gelatinization step or the drying step. In the rough cutting step, for example, the molded gypsum slurry is cut with a rotary cutter into a size that suits a dryer or a heating furnace used in the gelatinization step or the drying step.

In the drying step, the molded gypsum slurry is forcibly or naturally dried to form hardened gypsum.

In the cutting step, the molded gypsum slurry or the hardened gypsum is cut into a size of a product by using, for example, a cutting machine.

In the loading step, hardened gypsum products are stacked by, for example, a lifter, and stored in a warehouse or loaded onto a truck for shipping.

The hardened gypsum of the present embodiment is described above. Because the hardened gypsum of the present embodiment is produced by hardening the gypsum slurry described above, the produced hardened gypsum has high water repellency and high strength.

<<Gypsum Building Material, Gypsum Board>>

Next, a gypsum building material and a gypsum board of the present embodiment are described.

The gypsum building material of the present embodiment may include the hardened gypsum described above.

For example, the gypsum building material may include the hardened gypsum as a core. Examples of gypsum building materials include plate-shaped gypsum building materials such as a gypsum board, a glass mat gypsum board, a gypsum board including a glass fiber nonwoven fabric, and a slug gypsum board; and a block-shaped gypsum building material.

For example, a gypsum building material may be produced by a gypsum building material production method including steps described below.

The gypsum building material production method may include a step of producing the gypsum slurry (gypsum slip) described above. As described above, the gypsum slurry may be produced by mixing (or kneading) calcined gypsum, urea phosphate esterified starch, organopolysiloxane, and water. This step of mixing the materials of the gypsum slurry may be divided into two steps: a gypsum composition forming step of forming a gypsum composition by mixing calcined gypsum and urea phosphate esterified starch, and a gypsum slurry forming step of forming gypsum slurry by mixing the gypsum composition, organopolysiloxane, and water. Also, various additives and/or bubbles may be added to the gypsum slurry during its production step.

The gypsum building material production method may also include a molding step of molding the gypsum slurry according to the shape of the gypsum building material to be produced. In the molding step, the gypsum slurry may be molded into a desired shape according to the shape of the gypsum building material to be produced, and may also be processed as needed.

Similarly to the case of the hardened gypsum, a rough cutting step, a drying step, and/or a cutting step may be performed on the molded gypsum slurry. As described above in relation to the hardened gypsum, the water repellency of the gypsum building material of the present embodiment can be improved by gelatinizing urea phosphate esterified starch added to the gypsum slurry. Therefore, the gypsum building material production method of the present embodiment preferably includes a gelatinization step of gelatinizing urea phosphate esterified starch. Because the gelatinization process is already described as a part of the hardened gypsum production method, description of the gelatinization process is omitted here.

Thus, the gypsum building material production method of the present embodiment may include the hardened gypsum production method described above. Also, when the gypsum building material is a gypsum board, a gypsum board production method may include the hardened gypsum production method described above.

The gypsum building material production method is described in more detail below taking a gypsum board as an example.

First, a gypsum board molding step of molding gypsum slurry into a gypsum board is described. In the gypsum board molding step, the gypsum slurry (gypsum slip) is placed between sheets of board base paper.

FIG. 1 is a schematic side view of a part of an apparatus for molding gypsum slurry into a gypsum board.

In the apparatus of FIG. 1, front cover base paper (board base paper) 11, which is a surface material, is conveyed along a production line from right to left.

A mixer 12 may be disposed in a predetermined position relative to a conveying line, for example, above or alongside the conveying line. By one mixer 12, materials of the gypsum slurry including calcined gypsum, urea phosphate esterified starch, organopolysiloxane, water, and optionally, an adhesion improver, a setting modifier, and a water reducing agent are kneaded to produce the gypsum slurry. Also, as necessary, bubbles may be added to the gypsum slurry from splitting ports 121, 122, and 125.

Alternatively, a gypsum composition may be prepared in advance by mixing solid materials including calcined gypsum and urea phosphate esterified starch, and supplied to the mixer 12.

Obtained high-density gypsum slurry 13 is supplied via delivery pipes 123 and 124 onto the front cover base paper (board base paper) 11 and back cover base paper (board base paper) 16 at positions upstream of roll coaters 15 in their conveying directions.

Here, 171, 172, and 173 indicate a spreading roll, a backing roll, and a residue removing roll, respectively. The gypsum slurry 13 on each of the front cover base paper 11 and the back cover base paper 16 reaches a spreader implemented by the roll coater 15, and is spread by the spreader. As a result, both of a thin layer of the high-density gypsum slurry 13 and a margin area are formed on the front cover base paper 11. Similarly, a thin layer of the high-density gypsum slurry 13 is formed on the back cover base paper 16.

The front cover base paper 11 is conveyed in the same conveying direction. On the other hand, the conveying direction of the back cover base paper 16 is changed by a turning roller 18 toward the conveying line of the front cover base paper 11. Then, both of the front cover base paper 11 and the back cover base paper 16 reach a molder 19. Low-density gypsum slurry 14 is supplied from the mixer 12 via a pipe line 126 to a space between the thin layers of the gypsum slurry 13 formed on the front cover base paper 11 and the back cover base paper 16. As a result, a continuous three-layer structure including the front cover base paper 11, the low-density gypsum slurry 14, and the back cover base paper 16 is formed.

In the example of FIG. 1, low-density gypsum slurry and high-density gypsum slurry are produced by one mixer 12. However, two mixers may be provided, and low-density gypsum slurry and high-density gypsum slurry may be produced by the respective mixers. Also, instead of using low-density gypsum slurry and high-density gypsum slurry, one type of gypsum slurry with a given density may be produced and supplied onto the front cover base paper 11 and the back cover base paper 16.

The gypsum board molding step is described above. The three-layer structure formed in this step sets and reaches a rough-cutting cutter (not shown) by which a rough cutting step is performed. In the rough cutting step, the continuous three-layer structure is cut by the rough-cutting cutter into plate-shaped materials each of which has a predetermined length and is composed of a core mainly made of gypsum and base paper covering the core. That is, an intermediate product of the gypsum board is formed.

The plate-shaped material may be forwarded to a heating furnace to perform a gelatinization step where urea phosphate esterified starch is gelatinized.

Then, the plate-shaped material may be forwarded to a dryer (not shown) to perform a drying step where the plate-shaped material is forcibly dried. The drying step and the gelatinization step may be performed at the same time.

Thereafter, a cutting step may be performed to cut the plate-shaped material into products with a predetermined length. As a result, gypsum boards are produced.

An exemplary gypsum board production method of an embodiment is described above. However, the present invention is not limited to this embodiment. For example, formation of thin layers of high-density gypsum slurry in the molding step may be omitted, and a gypsum board may be produced using one type of gypsum slurry.

In this case, one type of gypsum slurry is supplied onto front cover base paper (board base paper), which is being continuously conveyed, to form a layer of the gypsum slurry. The front cover base paper is folded along score lines formed near the side edges of the front cover base paper such that the gypsum slurry is wrapped by the front cover base paper. Next, back cover base paper (board base paper), which is being conveyed at the same speed as the front cover base paper, is placed on the layer of the gypsum slurry.

Then, the resulting structure is caused to pass through a molder that determines the thickness and the width of a gypsum board.

After the gypsum slurry is molded into a desired shape through the above steps, similarly to the above described gypsum board production method, a rough-cutting step, a gelatinization step, a drying step, and a cutting step are performed on the molded gypsum slurry to produce a gypsum board.

A gypsum building material production method is described above taking a gypsum board as an example. However, various types gypsum building materials can be produced by, for example, replacing board base paper used as a surface material with a glass fiber nonwoven fabric (glass tissue) or a glass mat, and placing it on the surface of a gypsum slurry layer or embedding it near the surface of the gypsum slurry layer.

With the gypsum building material production method and the gypsum board production method described above, a gypsum building material and a gypsum board with high water repellency and high strength can be produced by hardening the gypsum slurry of the above embodiment.

EXAMPLES

The present embodiment is further described below based on examples. However, the present invention is not limited to those examples.

(1) Evaluation Methods

Methods used to test gypsum slurry (gypsum slip), hardened gypsum, and gypsum boards produced in experiments are described below.

(1-1) Water Absorption Content Measuring Test

The water absorption content (Aw) of the hardened gypsum or the gypsum board obtained in each experiment was measured and calculated according to an equation 1 below. In the equation 1, "mass after immersion" indicates the mass of the hardened gypsum or the gypsum board after being immersed in water with a temperature of 20±1° C. for two hours. Also, "mass before immersion" indicates the mass of the hardened gypsum or the gypsum board after the molded gypsum slurry is dried and the hardened gypsum or the gypsum board is further dried in a drier adjusted at 40±2° C., to a constant weight.

$$Aw\ (\%)=(\text{mass after immersion}-\text{mass before immersion})/(\text{mass before immersion})\times100 \qquad \text{(equation 1)}$$

(1-2) Flow Test

A flow text was performed on gypsum slurry (gypsum slip) produced in Experiment 3.

The flow test was performed as described below.

First, a cylinder, which is open at the upper and lower ends and has a diameter of 8.5 cm and a height of 4 cm, was placed on a flat plate, and produced gypsum slurry (gypsum slip) was poured through the upper opening into the cylinder until the cylinder was filled. Then, the cylinder was quickly lifted vertically upward, and the diameter of the gypsum slurry spread on the flat plate after the cylinder was lifted was measured as a flow value.

(2) Experiments

Experiments 1-3 were performed as described below, and obtained samples were evaluated according to the evaluation methods described above.

(Experiment 1)

Gypsum compositions were prepared by mixing 0.05 through 15 parts by mass of starch with 100 parts by mass of β-calcined gypsum (hemihydrate gypsum). In Experiment 1-1, as indicated by Table 1 below, seven types of gypsum compositions including 0.05 through 15 parts by mass of starch were prepared. Similarly, seven types of gypsum compositions were prepared in each of Experiment 1-2 and Experiment 1-3.

In Experiment 1-1, urea phosphate esterified starch (Oji Cornstarch Co., Ltd) made from corn-derived starch and having a gelatinization temperature of 54° C. was used to prepare the gypsum compositions. In Experiment 1-2, hydroxyethyl starch (Tate & Lyle PLC) derived from corn and having a gelatinization temperature of 63° C. was used to prepare the gypsum compositions. In Experiment 1-3, pregelatinized starch (SANSHO Co., Ltd.) derived from tapioca was used. Also, for comparison, samples that do not include starch were prepared in Experiment 1-4.

Next, gypsum slurry was prepared by adding, to each gypsum composition, 0.3 parts by mass of methylhydrogenpolysiloxane (Shin-Etsu Chemical Co., Ltd) and 105 parts by mass of water (specific gravity of hardened gypsum≈0.8) with respect to 100 parts by mass of calcined gypsum in the gypsum composition, and by agitating the resulting mixture for 15 seconds with a blender (SANYO Electric Co., Ltd; Model No. SM-R50). The prepared gypsum slurry was molded into a shape having a length of 80 mm, a width of 20 mm, and a thickness of 20 mm, and the molded gypsum slurry was dried to a constant weight. In the experiments, to reduce the drying time, a drying furnace was adjusted so that the temperature of a gypsum portion of the molded gypsum slurry would reach 40° C., and the molded gypsum slurry was dried by the drying furnace to a constant weight. Through this drying step, the molded gypsum slurry becomes hardened gypsum.

The water absorption content measuring test described above was performed on the dried hardened gypsum. The results of the water absorption content measuring test are shown in Table 1. The results of Experiments 1-1 through 1-3 are also shown in the graph of FIG. 2.

TABLE 1

| | WATER ABSORPTION CONTENT (%) AMOUNT OF STARCH (PARTS BY MASS) | | | | | | | |
|---|---|---|---|---|---|---|---|---|
| | 0 | 0.05 | 0.5 | 1 | 3 | 5 | 10 | 15 |
| EXPERIMENT 1-1 | — | 53.4 | 42.8 | 36.6 | 27.9 | 23.1 | 20.5 | 19.5 |
| EXPERIMENT 1-2 | — | 57 | 55.2 | 54.8 | 54.3 | 53.7 | 53.3 | 53.7 |
| EXPERIMENT 1-3 | — | 56.3 | 49.8 | 44.7 | 37.1 | 33.9 | 30.6 | 30.3 |
| EXPERIMENT 1-4 | 58.4 | — | — | — | — | — | — | — |

Figure 2:
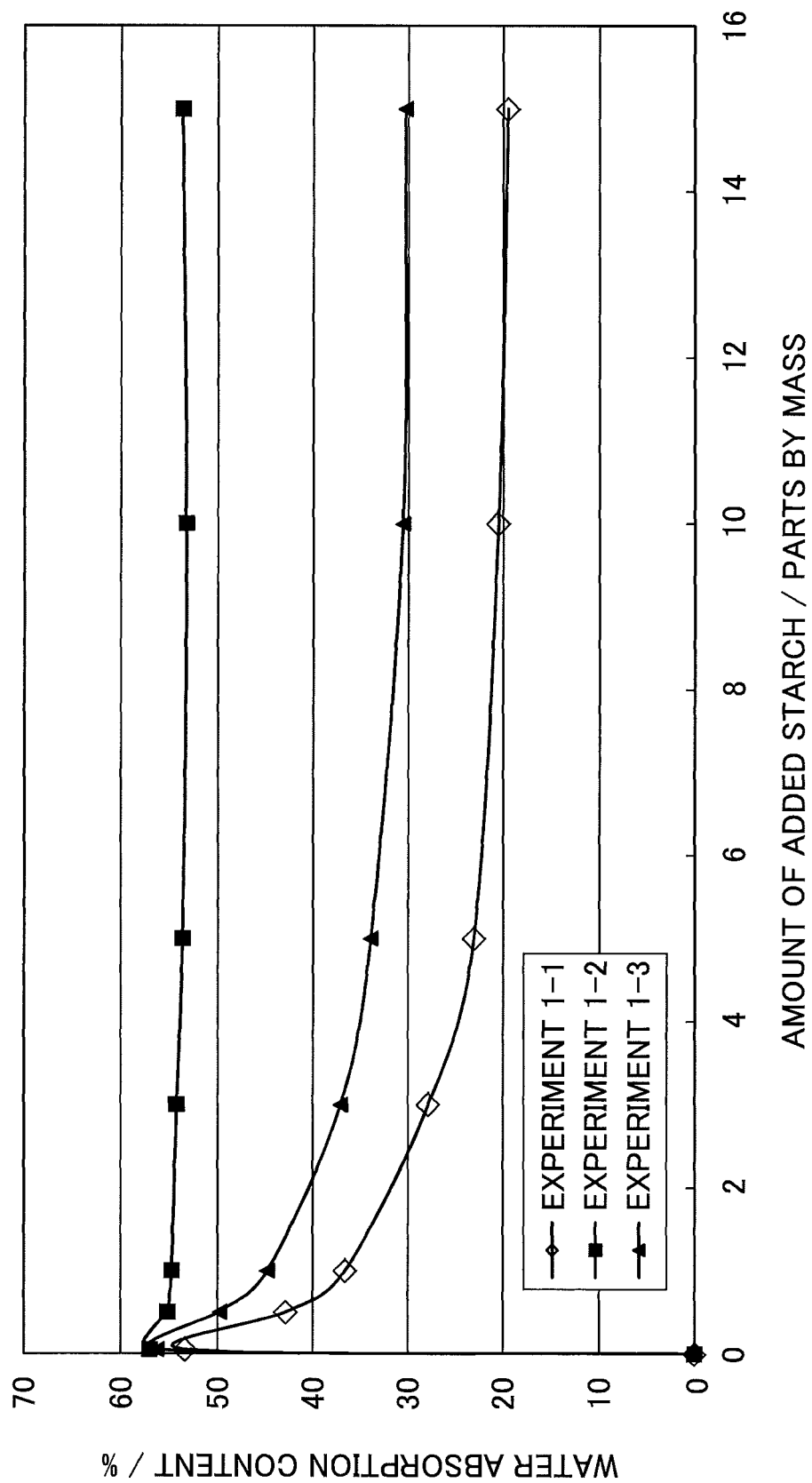
FIG. 2 is a graph illustrating a relationship between a water absorption content and the amount of added starch in experiments 1-1 through 1-3.

As indicated by the results of Table 1 and FIG. 2, the water absorption content measured in Experiment 1 according to the present embodiment is lower than the water absorption contents measured in Experiments 1-2, 1-3, and 1-4 of comparative examples. That is, the hardened gypsum of Experiment 1 has higher water repellency. In Experiment 1-2, the water repellency hardly improved by adding the starch. In Experiment 1-3, although the water repellency improved slightly by adding the starch, the degree of improvement is small compared with Experiment 1-1.

In Experiment 1-1, the water absorption content decreased as the amount of starch increased. That is, the water repellency improved as the amount of starch increased. However, when the amount of starch exceeds 5 parts by mass, the rate of change of the water absorption content decreases, i.e., the rate of increase in the effect of enhancing the water repellency decreases. Also, when the amount of starch exceeds 10 parts by mass, the water absorption content hardly changes, i.e., the effect of enhancing the water repellency hardly improves, even when the amount of starch is increased.

(Experiment 2)

Gypsum compositions were prepared by mixing 0.05 through 15 parts by mass of the same urea phosphate esterified starch as in Experiment 1-1 and 0.2 parts by mass of hydrated lime used as a water repellent adjuvant (catalyst) with 100 parts by mass of β-calcined gypsum (hemihydrate gypsum). Next, gypsum slurry was prepared by adding methylhydrogenpolysiloxane and water by the same ratios as in Experiment 1-1 with respect to 100 parts by mass of calcined gypsum in each gypsum composition, and by agitating the resulting mixture for 15 seconds with a blender. After the gypsum slurry was prepared, hardened gypsum was prepared in substantially the same manner as in Experiment 1-1 except for the drying temperature.

In Experiment 2, a drying furnace was adjusted so that the temperature of a gypsum portion of the hardened gypsum would reach a predetermined temperature, and the hardened gypsum was dried by the drying furnace to a constant weight. The predetermined temperature was set at 40° C. in Experiment 2-1, at 80° C. in Experiment 2-2, and at 120° C. in Experiment 2-3.

Also, for comparison, Experiments 2-1' through 2-3' were performed without adding starch to gypsum slurry. That is, in each of Experiment 2-1', Experiment 2-2', and Experiment 2-3', hardened gypsum was prepared in substantially the same manner as in the corresponding one of Experiments 2-1, Experiment 2-2, and Experiment 2-3 except that starch was not added to the gypsum slurry.

The water absorption content measuring test described above was performed on the dried hardened gypsum. The results of the water absorption content measuring test are shown in Table 2. The results of Experiments 2-1 through 2-3 are also shown in the graph of FIG. 3.

TABLE 2

| | WATER ABSORPTION CONTENT (%) AMOUNT OF STARCH (PARTS BY MASS) | | | | | | | |
|---|---|---|---|---|---|---|---|---|
| | 0 | 0.05 | 0.5 | 1 | 3 | 5 | 10 | 15 |
| EXPERIMENT 2-1 | — | 35.6 | 28.6 | 24.4 | 18.6 | 15.4 | 12.5 | 11.5 |
| EXPERIMENT 2-2 | — | 35.6 | 11.5 | 6.5 | 5.4 | 4.5 | 3.5 | 3.5 |
| EXPERIMENT 2-3 | — | 39.7 | 16.8 | 11.6 | 9.7 | 8.2 | 5.6 | 5.8 |
| EXPERIMENT 2-1' | 38.9 | — | — | — | — | — | — | — |
| EXPERIMENT 2-2' | 38.9 | — | — | — | — | — | — | — |
| EXPERIMENT 2-3' | 43.4 | — | — | — | — | — | — | — |

Figure 3:
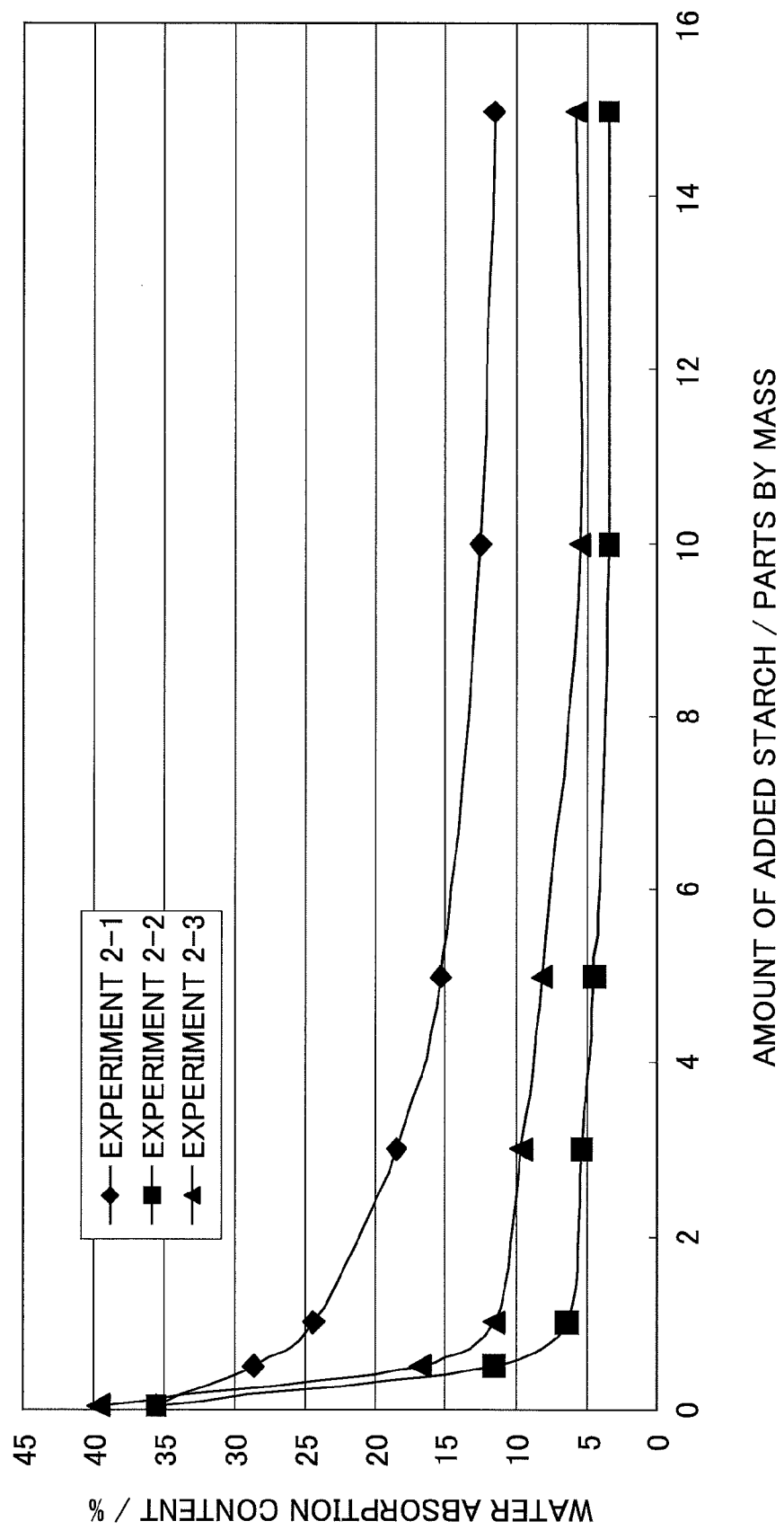
FIG. 3 is a graph illustrating a relationship between a water absorption content and the amount of added starch in experiments 2-1 through 2-3.

As indicated by the results of Table 2 and FIG. 3, the water absorption contents measured in Experiments 2-1, 2-2, and 2-3 according to the present embodiment are lower than the water absorption contents measured in Experiments 2-1', 2-2', and 2-3'. Particularly, the water absorption contents measured in Experiments 2-2 and 2-3 where the gelatinization process was performed by heating the hardened gypsum at temperatures greater than the gelatinization temperature of urea phosphate esterified starch are significantly lower than the water absorption content measured in Experiment 2-1 where the gelatinization process was not performed. That is, the hardened gypsum of Experiments 2-2 and 2-3 has higher water repellency.

When Experiment 2-2 and Experiment 2-3 are compared, the water absorption content measured in Experiment 2-3 where the gelatinization process was performed at a higher temperature is higher than the water absorption content measured in Experiment 2-2. That is, the water repellency of the hardened gypsum of Experiment 2-3 is lower than that of Experiment 2-2. It is assumed that a part of dihydrate gypsum in the gypsum slurry returned to hemihydrate gypsum when the hardened gypsum was heated at a temperature greater than 100° C., and the water repellency decreased due to the water absorbing property of hemihydrate gypsum.

(Experiment 3)

In Experiment 3, gypsum slurry and gypsum boards were produced and evaluated as described below.

Gypsum compositions were prepared by mixing 0.05 through 15 parts by mass of starch and 0.2 parts by mass of hydrated lime used as a water repellent adjuvant (catalyst) with 100 parts by mass of β-calcined gypsum (hemihydrate gypsum). In Experiment 3-1, as indicated by Table 3 below, seven types of gypsum compositions including 0.05 through 15 parts by mass of starch were prepared. Similarly, seven types of gypsum compositions were prepared in Experiment 3-2.

In Experiment 3-1, urea phosphate esterified starch (Oji Cornstarch Co., Ltd) made from corn-derived starch and having a gelatinization temperature of 54° C. was used to prepare the gypsum compositions. In Experiment 3-2, pregelatinized starch (SANSHO Co., Ltd.) derived from tapioca was used.

Next, gypsum slurry was prepared by adding, to each gypsum composition, 0.5 parts by mass of methylhydrogenpolysiloxane (Shin-Etsu Chemical Co., Ltd) and 105 parts by mass of water (specific gravity of hardened gypsum≈0.8) with respect to 100 parts by mass of calcined gypsum in the gypsum composition, and by agitating the resulting mixture for 15 seconds with a blender (SANYO Electric Co., Ltd; Model No. SM-R50).

Also, for comparison, gypsum slurry was prepared in Experiment 3' in substantially the same manner as in Experiments 3-1 and 3-2 except that no starch is added to the gypsum slurry.

Figure 4:
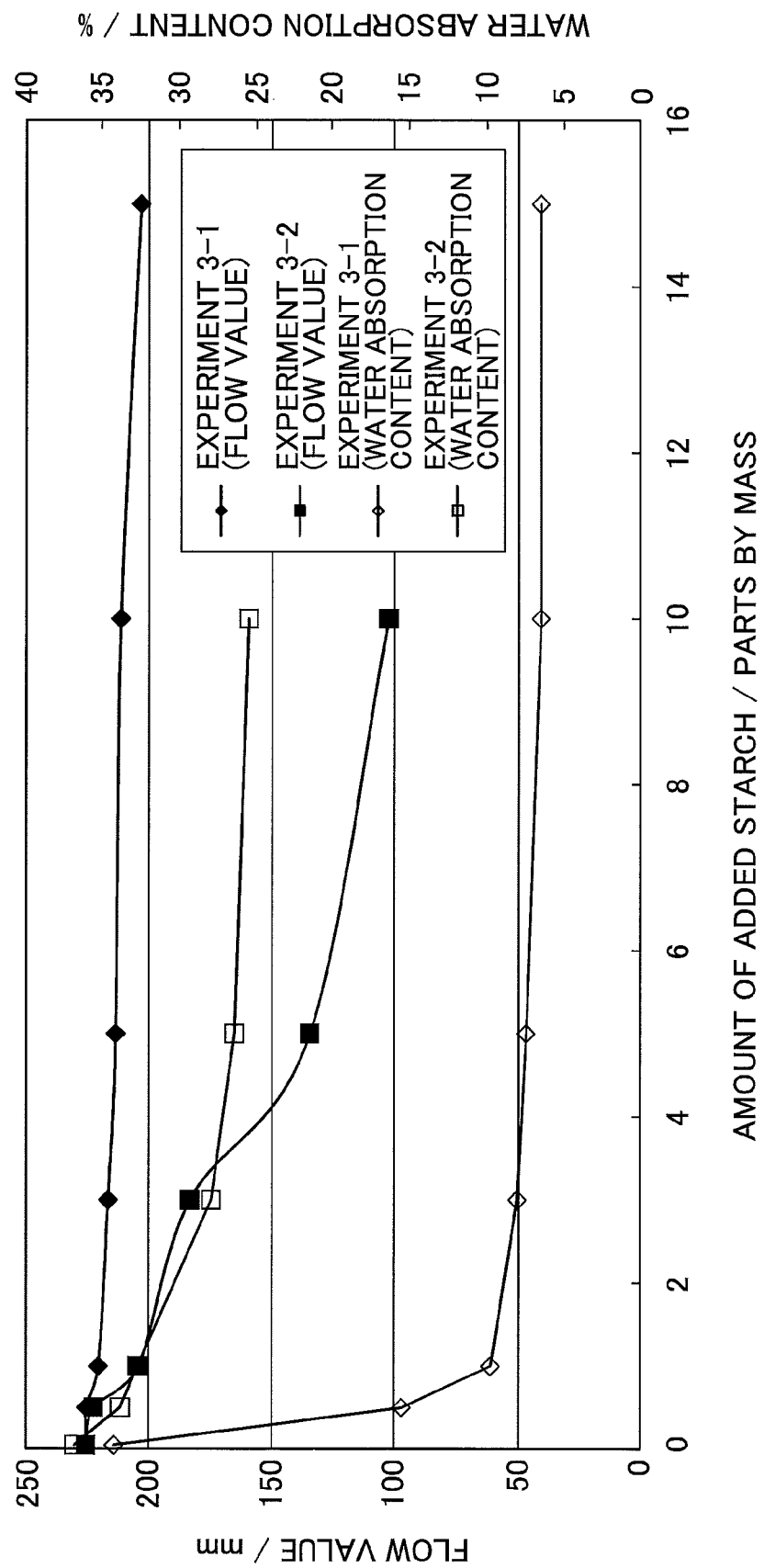
FIG. 4 is a graph illustrating a relationship between a water absorption content and a flow value in experiments 3-1 and 3-2.

The flow test described above was performed on the prepared gypsum slurry. The results of the flow test are shown in Table 3. The results of Table 3 are also shown in the graph of FIG. 4.

is spread by the spreader. As a result, both of a thin layer of the high-density gypsum slurry 13 and a margin area are formed on the front cover base paper 11. Similarly, a thin layer of the high-density gypsum slurry 13 is formed on the back cover base paper 16.

The front cover base paper 11 is conveyed in the same conveying direction. On the other hand, the conveying direction of the back cover base paper 16 is changed by the turning roller 18 toward the conveying line of the front cover base paper 11.

TABLE 3

| | | AMOUNT OF STARCH (PARTS BY MASS) | | | | | | |
|---|---|---|---|---|---|---|---|---|
| | | 0 | 0.05 | 0.5 | 1 | 3 | 5 | 10 | 15 |
| EXPERIMENT 3-1 | WATER ABSORPTION CONTENT (%) | — | 34.2 | 15.5 | 9.8 | 8.1 | 7.5 | 6.5 | 6.5 |
| | FLOW VALUE (mm) | — | 225 | 225 | 220 | 216 | 213 | 211 | 203 |
| EXPERIMENT 3-2 | WATER ABSORPTION CONTENT (%) | — | 36.8 | 33.8 | 32.7 | 27.9 | 26.4 | 25.5 | NOT KNEADABLE |
| | FLOW VALUE (mm) | — | 225 | 222 | 204 | 183 | 134 | 102 | NOT KNEADABLE |
| EXPERIMENT 3-3 | WATER ABSORPTION CONTENT (%) | 37.4 | — | — | — | — | — | — | — |
| | FLOW VALUE (mm) | 225 | — | — | — | — | — | — | — |

As indicated by the results of Table 3 and FIG. 4, in Experiment 3-1 of the present embodiment where urea phosphate esterified starch was used, the flow value did not change greatly even when the amount of starch was increased, and the high fluidity of the gypsum slurry was maintained. On the other hand, in Experiment 3-2 of a comparative example, the flow value greatly decreased as the amount of starch increased. When the amount of starch was 15 parts by mass, it was even difficult to knead the gypsum slurry.

Next, a gypsum board was produced for each of Experiments 3-1 through 3-3 using the corresponding gypsum slurry, and the water absorption content of the gypsum board was evaluated.

The method used to produce the gypsum boards is described with reference to FIG. 1.

In the apparatus of FIG. 1, the front cover base paper (board base paper) 11 is continuously conveyed along the production line from right to left.

As illustrated by FIG. 1, the mixer 12 is disposed above or alongside the conveying line. The gypsum slurry of each experiment was produced by one mixer 12.

When producing the gypsum board, low-density gypsum slurry and high-density gypsum slurry were used. Bubbles were added from the splitting port 125 to the low-density gypsum slurry such that the specific gravity of the produced gypsum board would become about 0.5. As the high-density gypsum slurry, the gypsum slurry prepared in each experiment was used without adding bubbles.

The high-density gypsum slurry was supplied from the splitting ports 121 and 122 via the delivery pipes 123 and 124 onto the front cover base paper 11 and the back cover base paper 16 at positions upstream of the roll coaters 15 in their conveying directions.

The high-density gypsum slurry supplied onto each of the front cover base paper 11 and the back cover base paper 16 reaches the spreader implemented by the roll coater 15, and Then, both of the front cover base paper 11 and the back cover base paper 16 reach the molder 19. While adding bubbles at the splitting port 125, the low-density gypsum slurry 14 is supplied from the mixer 12 via the pipe line 126 to a space between the thin layers of the high-density gypsum slurry 13 formed on the front cover base paper 11 and the back cover base paper 16. As a result, a continuous three-layer structure including the front cover base paper 11, the low-density gypsum slurry 14, and the back cover base paper 16 is formed.

The formed three-layer structure sets and reaches a rough cutting cutter (not shown). The three-layer structure was roughly cut by the rough cutting cutter according to the size of a dryer.

Then, the cut three-layer structure was forwarded to the dryer (not shown), and a drying step was performed to forcibly dry the cut three-layer structure. Then, a cutting step was performed to cut the dried structure into a gypsum board having a length of 300 mm and a width of 300 mm. The thickness of the obtained gypsum board was 12.5 mm.

In the drying step, a drying furnace was adjusted so that the temperature of a gypsum portion of the gypsum board would reach 80° C. This indicates that urea phosphate esterified starch added to the gypsum board of Experiment 3-1 was gelatinized in the drying step.

The water absorption content measuring test described above was performed on each gypsum board (specific gravity≈0.5) produced by the above process and having a thickness of 12.5 mm. The results of the water absorption content measuring test are shown in Table 3. The results of Table 3 are also shown in the graph of FIG. 4.

As indicated by the results of Table 3 and FIG. 4, the water absorption content of the gypsum board produced using the gypsum slurry of Experiment 3-1 of the present embodiment is lower than the water absorption content of the gypsum board produced using the gypsum slurring of Experiment 3-2 of a comparative example. That is, the gypsum board of Experiment 3-1 has higher water repellency.

This indicates that compared with pregelatinized starch, urea phosphate esterified starch has a better water-repellency enhancing effect.

Gypsum slurry, hardened gypsum, a gypsum building material, a gypsum board, a gypsum slurry production method, a hardened gypsum production method, a gypsum building material production method, and a gypsum board production method according to the embodiment are described above. However, the present invention is not limited to the specifically disclosed embodiment, and variations and modifications may be made without departing from the scope of the present invention.

The present application is based on and claims the benefit of priority of Japanese Patent Application No. 2013-246716 filed on Nov. 28, 2013, the entire contents of which are hereby incorporated herein by reference.

EXPLANATION OF REFERENCE NUMERALS

13, 14 Gypsum slurry

The invention claimed is:

1. A gypsum slurry, comprising: calcined gypsum; urea phosphate esterified starch; organopolysiloxane; and water.

2. The gypsum slurry as claimed in claim 1, wherein an amount of the urea phosphate esterified starch in the gypsum slurry is greater than or equal to 0.05 parts by mass and less than or equal to 10 parts by mass with respect to 100 parts by mass of the calcined gypsum.

3. The gypsum slurry as claimed in claim 1, wherein a gelatinization temperature of the urea phosphate esterified starch is less than or equal to 100° C.

4. The gypsum slurry as claimed in claim 1, wherein the organopolysiloxane includes methylhydrogenpolysiloxane having a structure represented by the following formula (1):

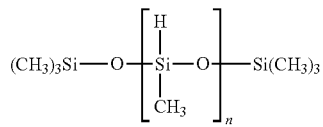

(1)

5. A hardened gypsum obtained by hardening the gypsum slurry of claim 1.

6. A gypsum building material comprising the hardened gypsum of claim 5.

7. A gypsum board comprising the hardened gypsum of claim 5.

8. A method of producing a gypsum slurry, the method comprising:
forming a gypsum composition by mixing calcined gypsum and urea phosphate esterified starch; and
forming the gypsum slurry by mixing the gypsum composition, organopolysiloxane, and water.

9. The method as claimed in claim 8, wherein an amount of the urea phosphate esterified starch in the gypsum slurry is greater than or equal to 0.05 parts by mass and less than or equal to 10 parts by mass with respect to 100 parts by mass of the calcined gypsum.

10. The method as claimed in claim 8, wherein a gelatinization temperature of the urea phosphate esterified starch is less than or equal to 100° C.

11. The method as claimed in claim 8, wherein the organopolysiloxane includes methylhydrogenpolysiloxane having a structure represented by the following formula (1):

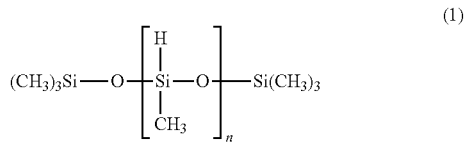

(1)

12. A method of producing a hardened gypsum, the method comprising:
molding the gypsum slurry produced by the method of claim 8 to produce a molded gypsum slurry.

13. The method as claimed in claim 12, further comprising:
gelatinizing the urea phosphate esterified starch after molding the gypsum slurry.

14. The method as claimed in claim 13, wherein the gelatinizing includes heating the molded gypsum slurry at a temperature less than or equal to 100° C.

15. A method of producing a gypsum building material comprising the method of producing the hardened gypsum of claim 12.

16. A method of producing a gypsum board comprising the method of producing the hardened gypsum of claim 12.

* * * * *